United States Patent [19]

Lidy et al.

[11] 4,267,078

[45] May 12, 1981

[54] PROCESS FOR EASILY DEGRADING WASTE CONSISTING OF THE REACTION PRODUCTS OF ORGANIC COMPOUNDS CONTAINING ISOCYANATE GROUPS WITH ALCOHOLS AND/OR WATER

[75] Inventors: Werner Lidy, Essen; Gerd Rossmy, Haltern-Lavesum; Hans-Joachim Kollmeier, Essen, all of Fed. Rep. of Germany

[73] Assignee: Th. Goldschmidt AG, Essen, Fed. Rep. of Germany

[21] Appl. No.: 55,075

[22] Filed: Jul. 5, 1979

[30] Foreign Application Priority Data

Aug. 5, 1978 [DE] Fed. Rep. of Germany ....... 2834431

[51] Int. Cl.$^3$ ............................................. C08J 11/00
[52] U.S. Cl. ................................... 260/2.3; 521/156; 521/167

[58] Field of Search ................. 260/2.3; 521/156, 167; 528/46

[56] References Cited

U.S. PATENT DOCUMENTS

| | | | |
|---|---|---|---|
| 3,708,440 | 1/1973 | Frulla et al. | 260/2.3 |
| 3,983,087 | 9/1976 | Tucker et al. | 260/2.3 |
| 4,110,266 | 8/1978 | Sheraite | 260/2.3 |

*Primary Examiner*—Theodore E. Pertilla
*Attorney, Agent, or Firm*—Toren, McGeady and Stanger

[57] ABSTRACT

A method for easily degrading wastes consisting of the reaction products of organic materials containing isocyanate groups and specifically foamed polyurethane wastes by comminuting the waste and reacting it with alkylene oxide at 120° C. to 200° C. and removing the unreacted alkylene oxide. The products obtained are homogeneous liquids which can be added to polyols for reaction with isocyanates to form foamed polyurethanes.

3 Claims, No Drawings

4,267,078

PROCESS FOR EASILY DEGRADING WASTE CONSISTING OF THE REACTION PRODUCTS OF ORGANIC COMPOUNDS CONTAINING ISOCYANATE GROUPS WITH ALCOHOLS AND/OR WATER

BACKGROUND OF THE INVENTION

1. Field of the Invention

The invention relates to a process for easily degrading waste consisting of the reaction products of organic compounds, containing isocyanate groups, with alcohols and/or water. In particular, it relates to a process for easily degrading polyurethane waste.

2. Description of the Prior Art

Polyurethane waste is produced in relatively large amounts in the form of pieces of foam, for example, in the manufacture of upholstery components. Furthermore, polyurethane waste is obtained in the manufacture of hard-foam panels or shock-absorbing parts.

The elimination of polyurethane waste in foamed form is of particular interest since, because of its low density, this waste takes up a large volume and is difficult to store. Burning the waste leads to pollution of the environment and to the loss of the raw materials used to prepare the foam.

For this reason, various method have already been investigated for working up such polyurethane waste so as to recover the starting materials. For example, polyurethane foam waste has been subjected to the action of water at temperatures up to 400° C. in a closed system. In this process, there is a partial hydrolytic degradation of the foam structure. The process, however, essentially has two disadvantages. A degradation product consisting of two phases is formed, one phase consisting essentially of the polyol component of the foam material and the other, essentially of the amine component of the foam material. The separation of the two phases is exceedingly difficult and can be incompletely carried out only.

Another disadvantage is that the polyol component which is to be reused for foaming, can be freed from the water it contains only by considerable effort. This residual water content interferes with the usefulness of the polyol as a foam-forming component. Also, the use of temperatures up to 400° C. also promotes the formation of thermal degradation products of the foam material which impair the application properties of the polyol component which is to be reused.

Processes for improving this hydrolysis process have become known. For example, a process is described in German Offenlegungsschrift No. 23 62 921 for converting polyurethane foam into diamines and a liquid, polymeric hydrolysis product of the polyurethane, while at the same time separating the diamines from the liquid, polymeric hydrolysis product.

In this process:

(a) the polyurethane foam is introduced into a closed reaction zone kept at a temperature in the range of about 218° to 400° C. (425° to 750° F.), (b) water vapor is introduced into the reaction zone in an amount sufficient for producing a pressure of about 0.5 to about 1.5 atmospheres at this temperature in the reaction zone, (c) the gaseous outflow from the reaction zone, which contains the water vapor and the diamines, is removed and (d) the liquid, polymeric hydrolysis product of the polyurethane is removed from the reaction zone.

While with this process the amine portion can be separated from the polyol component of the hydrolytically split foam material, a reaction temperature up to 400° C. is still required. Moreover, the disadvantage of having to remove the water contained in the polyol before the latter is used again remains.

For this reason, attempts have been made to substitute a multifunctional alcohol for the water previously used in the degradation of the polyurethane foam. Success has been achieved if, for example, a linear, bifunctional alcohol, such as, ethylene glycol, is used instead of water. Once again, however, a degradation product is obtained which consists of two layers which are difficult to separate from one another.

The object of U.S. Pat. No. 3,983,087 is a process for the degradation of polyurethane foam waste to a homogeneous mixture of polyols by the use of branched alkylene glycols, such as, for example, 1,2-propylene glycol. In this process, the polyurethane foam is broken down using up to equal parts by weight of propylene glycol at temperatures of 180° to 250° C. to form a uniform, homogeneous phase. A significant disadvantage of this process is that the degradation product contains propylene glycol which interferes with the foam formation when the polyol obtained is used as a foam component. A preferred embodiment of the process described in U.S. Pat. No. 3,983,087 is to allow the alkylene oxide to react with the degradation product containing the propylene glycol in order the convert the propylene glycol into higher molecular weight compounds.

Finally, a process for the recovery of polyols from polyurethane is described in German Offenlegungsschrift No. 25 34 465. In this process, a polyurethane is dissolved in an aliphatic diol with a molecular weight of approximately 400 to 3,000 and a boiling point of at least 180° C. and the mixture is heated in the presence of a halogenated phosphoric acid ester to approximately 170° to 250° C., the weight ratio of aliphatic diol to halogenated phosphoric acid ester being 1:1 to 20:1. The process is disadvantageous because a two-phase product is obtained from the working up, although the two phases can be separated relatively readily. For the working up, the relatively expensive halogenated phosphoric acid ester is required, which is not absolutely safe for physiological reasons.

Occasionally, it is also necessary to convert isocyanates which no longer can be used because of impurities or for other reasons, into a form in which they can be disposed of. For this purpose, they may be reacted with water. The conversion of these waste materials into industrially usable compounds is also desirable.

SUMMARY OF THE INVENTION

We have discovered an easy process for degrading waste which consists of the reaction products of organic compounds, containing isocyanate groups with alcohols and/or water, and especially for degrading polyurethane waste. With this process, the degradation product obtained can be directly used as the polyol component without having to be dried or worked up in any other way. At the same time, the formation of multiphase degradation products is avoided.

The present process comprises comminuting the waste mechanically and allowing ethylene oxide and/or propylene oxide to react with the waste in amounts of at least 20% by weight based on the waste and at temperatures of 120° to 200° C. and then, if necessary, removing the unreacted alkylene oxide. Preferably, equal parts by weight of ethylene oxide and/or propylene oxide are allowed to react with the waste. The use of propylene oxide in the inventive process is preferred.

DESCRIPTION OF THE PREFERRED EMBODIMENT

The comminution of the waste can take place in a knife mill. The particle size of the comminuted waste is of the order of a few cubic centimeters and less.

In the present process, the entire waste material, irrespective of whether it consists of polyurethane foam or of polyurea compounds in the case of reaction products of multifunctional isocyanates with water, is converted into a homogeneous, viscous, brightly colored to medium brown liquid. Separation into various phases is not observed, even when the product has stood for extended periods.

Presumably, the alkylene oxide adds to the NH group of the urethanes or of the urea contained in the foam and that additional transesterification reactions may occur. Polyurethane waste, worked up by the present process, may be added, without further treatment, to fresh polyol as a hydroxyl group containing component for the reaction with polyisocyanate in amounts of up to 50% by weight, based on the fresh polyol.

It is also possible, and preferred, to apportion the polyurethane waste to a polyol in amounts of 10 to 50% by weight based on the polyol and to subject this mixture to reaction with alkylene oxide. In so doing, a product is formed which can be reacted directly with polyisocyanate.

The polyol component, used for the dispersion, advisably should be similar to the polyol component contained in the polyurethane which is to be degraded. Glycerin, pentaerythritol, sucrose and sorbitol are therefore preferably used as the polyol. With this procedure, the degradation of polyurethane waste is particularly gentle and rapid.

Alkylene oxide acts on the polyurethane waste in an amount corresponding to at least 20% by weight of alkylene oxide, based on the polyurethane waste. If an excess of alkylene oxide is used which does not add on to the waste under the conditions of the process, it is advisable to distill off the excess alkylene oxide under reduced pressure and, in the case of larger batches especially, to recover it by condensation.

With a suitable arrangement of the necessary equipment, the present process can also be carried out continuously by maintaining a continuous supply of a dispersion of the polyol in a foam to the reactor and introducing a corresponding amount of alkylene oxide into the reactor. With the help of a screw conveyor, the material to be reacted can be guided through the reaction space. At the end of the reactor, the material is discharged and freed from excess alkylene oxide which is reintroduced into the inlet zone of the reactor.

The process of the present invention is highly advantageous especially when working up a polyurethane foam based on polyether or polyester polyols. The degradation products obtained can be added to fresh polyol in amounts of 10 to 30% by weight without impairing the quality of the foam.

The following examples illustrate the inventive process. In the examples, the degradation of two foams, A and B, is described. These foams were obtained using the following formulations:

Foam A is a hard foam and was obtained using the following formulation:
  100 parts by weight of polyether, based on sucrose, OH number 520,
  1 part by weight of water,
  3 parts by weight of triethylamine,
  1 part by weight of a polysiloxane-polyoxyalkylene copolymer stabilizer,
  40 parts by weight of trichlorofluoromethane,
  155 parts by weight of crude methylene-bis-phenylisocyanate.

Foam B is a soft foam and was obtained using the following formulation:
  100 parts by weight of a polyether with a molecular weight of 3,500 based on glycerin, reacted with a mixture of ethylene oxide and propylene oxide,
  4 parts by weight of water,
  0.2 parts by weight of tin octoate,
  0.2 parts by weight of dimethylethanolamine,
  0.8 parts by weight of polysiloxane-polyoxyalkylene copolymer stabilizer,
  48.4 parts by weight of toluene diisocyanate with an isomer ratio of 80:20.

EXAMPLE 1

Foam A (100 g) is comminuted in a knife mill and filled into a 500 ml autoclave together with 200 g of propylene oxide. The mixture is heated with stirring for 12 hours to 120° C. The reaction product is taken from the cooled autoclave in the form of a homogeneous liquid and freed from excess propylene oxide under vacuum. The OH number of the end product is 340 mg KOH/g.

EXAMPLE 2

Comminuted foam B (100 g), together with 250 g of ethylene oxide is heated for 6 hours at 120° C. in an autoclave. The end product, freed from excess ethylene oxide, has an OH number of 226 mg KOH/g and is a homogeneous liquid.

EXAMPLE 3

Comminuted foam B (100 parts by weight) is dispersed in 500 parts by weight of a polyether which is similar to that used in the manufacture of foam B, and heated together with 200 g of propylene oxide for 10 hours at 120° C. in an autoclave. The end product, freed from excess propylene oxide, has the OH number of 87 mg KOH/g. It is a viscous liquid.

From the end product so obtained, a foam was once again prepared using the following formulation:
  100 parts by weight of the worked-up waste product obtained as described in Example 3,
  0.8 parts by weight of a polysiloxane-polyoxyalkylene copolymer stabilizer,
  4 parts by weight of water,
  0.2 parts by weight of tin octoate,
  0.2 parts by weight of dimethylethanolamine,
  52.2 parts by weight of toluene diisocyante with an isomer ratio of 80:20.

The foam obtained had open cells and a density of 21.8 kg/m$^3$. The physical properties of the foam, such as, hardness, density, tear strength and load-carrying capacity, meet the technical requirements.

EXAMPLE 4

A polyester foam, an integral foam, and another polyether foam were worked up in accordance with the present invention using the procedure of Example 1. The results are summarized in the following table. As the alkylene oxide, propylene oxide was used.

| Type of Foam | Weight Ratio Foam:Alkylene Oxide | Reaction Time | Reaction Temperature | OH Number |
|---|---|---|---|---|
| Polyester Foam | 1:4 | 9 hours | 120° C. | 245 |
| Integral Foam | 1:3 | 10 hours | 120° C. | 64 |
| Polyether Foam | 1:1 | 10 hours | 120° C. | 165 |

EXAMPLE 5

In this example, a waste material obtained by the reaction of toluene diisocyanate with water is treated. The waste material, consisting of polyphenylurea, was heated in 200 ml of propylene oxide for 10 hours at 110° C. The excess propylene oxide was then removed. A homogeneous, highly viscous product with an OH number of 301 mg KOH/g was formed. The product was suitable for the manufacture of a hard polyurethane foam to be used as an insulating material.

What is claimed is:

1. A process for easily degrading waste composed of the reaction products of organic compounds containing isocyanate groups with alcohols or water, consisting essentially of mechanically comminuting the waste, reacting at least 20% by weight of an alkylene oxide selected from the group consisting of ethylene oxide, propylene oxide and mixtures thereof, based on the total weight of the waste, with the waste in a closed reactor at temperatures of from 120° C. to 200° C., and then removing any unreacted alkylene oxide.

2. The process of claim 1 wherein equal parts by weight of the alkylene oxide are reacted with the waste.

3. The process of claims 1 or 2 wherein the waste is dispersed in a polyol in amounts of 10 to 50% by weight, based on the polyol and then reacted with the alkylene oxide.

* * * * *